United States Patent
Windmeier et al.

(10) Patent No.: US 11,709,484 B2
(45) Date of Patent: Jul. 25, 2023

(54) COMPUTER-IMPLEMENTED METHOD FOR SIZING A PROCESS PLANT

(71) Applicant: Linde GmbH, Pullach (DE)

(72) Inventors: Christoph Windmeier, Geretsried (DE); Tobias Lautenschlager, Gröbenzell (DE); Bernd Wunderlich, Starnberg (DE)

(73) Assignee: Linde GmbH, Pullach (DE)

( * ) Notice: Subject to any disclaimer, the term of this patent is extended or adjusted under 35 U.S.C. 154(b) by 344 days.

(21) Appl. No.: 17/041,698

(22) PCT Filed: Mar. 18, 2019

(86) PCT No.: PCT/EP2019/025070
§ 371 (c)(1),
(2) Date: Sep. 25, 2020

(87) PCT Pub. No.: WO2019/185198
PCT Pub. Date: Oct. 3, 2019

(65) Prior Publication Data
US 2021/0048801 A1 Feb. 18, 2021

(30) Foreign Application Priority Data

Mar. 27, 2018 (EP) .................................. 18020115

(51) Int. Cl.
*G06F 30/20* (2020.01)
*G05B 19/418* (2006.01)
*G06F 111/06* (2020.01)

(52) U.S. Cl.
CPC ..... *G05B 19/4188* (2013.01); *G05B 19/4183* (2013.01); *G05B 19/41865* (2013.01);
(Continued)

(58) Field of Classification Search
CPC ............ G05B 19/4188; G05B 19/4183; G05B 19/41865; G05B 19/41885; G06F 30/20; G06F 2111/06
See application file for complete search history.

(56) References Cited

U.S. PATENT DOCUMENTS

2013/0238149 A2 * 9/2013 Yasni ...................... F22B 35/18
700/286
2018/0282635 A1 * 10/2018 Van de Cotte ........ F04D 27/001

OTHER PUBLICATIONS

Vasičkaninová A, Bakošová M. Control of a heat exchanger using neural network predictive controller combined with auxiliary fuzzy controller. Applied Thermal Engineering. Oct. 5, 2015;89:1046-53. (Year: 2015).*

(Continued)

*Primary Examiner* — Chuen-Meei Gan
(74) *Attorney, Agent, or Firm* — Millen, White, Zelano & Branigan, P.C.; William Nixon

(57) ABSTRACT

The present invention relates to a computer-implemented method for performing a chemical engineering process, in particular in an air separation plant or a natural gas plant, wherein a multiplicity of process simulations are performed simultaneously, in the course of each of which the process in the process plant is in each case simulated for a particular application case, wherein each application case is characterized by values of process plant variables and/or values of process parameters, wherein, in the multiplicity of process simulations, values for the process plant variables and/or for the process parameters are determined such that at least one predefined condition is met, wherein free values for process plant variables and/or process parameters are determined, and wherein dependent values for process plant variables and/or process parameters are determined from the free values for process plant variables and/or process parameters.

17 Claims, 1 Drawing Sheet

(52) U.S. Cl.
CPC ........ *G05B 19/41885* (2013.01); *G06F 30/20* (2020.01); *G06F 2111/06* (2020.01)

(56) References Cited

OTHER PUBLICATIONS

Rangaiah GP, Sharma S, Sreepathi BK. Multi-objective optimization for the design and operation of energy efficient chemical processes and power generation. Current Opinion in Chemical Engineering. Nov. 1, 2015;10:49-62. (Year: 2015).*

Liao HT, Yang LJ, Du XZ, Yang YP. Influences of height to diameter ratios of dry-cooling tower upon thermo-flow characteristics of indirect dry cooling system. International Journal of Thermal Sciences. Aug. 1, 2015;94:178-92. (Year: 2015).*

Rangaiah, G.P. et al., "Multi-Objective Optimization in Chemical Engineering: Developments and Applications," published Mar. 20, 2013, Retrieved from the Internet URL: https://www.twirpx.com/file/1870538/grant/, on Sep. 9, 2020, believed same as Examiner's retrieval from the Internet at https://ebookcentral.proquest.com/lib/epo-ebooks/detail.action?DocID=1158627&query=gade+pandu+rangaiah#tgoto_toc, on Sep. 19, 2018, pp. 1-102.

Painton, L.A. et al., "Synthesizing optimal design configurations for a Brayton cycle power plant," Computers & Chemical Engineering—May 1994, published Sep. 27, 1993, vol. 18, Issue 5, Retrieved from the Internet URL: http://www.vri-custom.org/pdfs/paper79.pdf, on Sep. 9, 2020, believed same as Examiner's retrieval from the Internet at https://ac.els-cdn.com/0098135494880182/1-s2.0-0098135494880182-main.pdf?_Tid=1fe20b9e-dfbd-4a68-b54c-b993feb932dc&acdef1062e18426912_24c19ff, on Sep. 20, 2018, pp. 369-381.

International Search Report of the International Searching Authority for PCT/EP2019/025070 dated Jul. 8, 2019.

English translation of International Search Report of the International Searching Authority for PCT/EP2019/025070 dated Jul. 8, 2019.

* cited by examiner

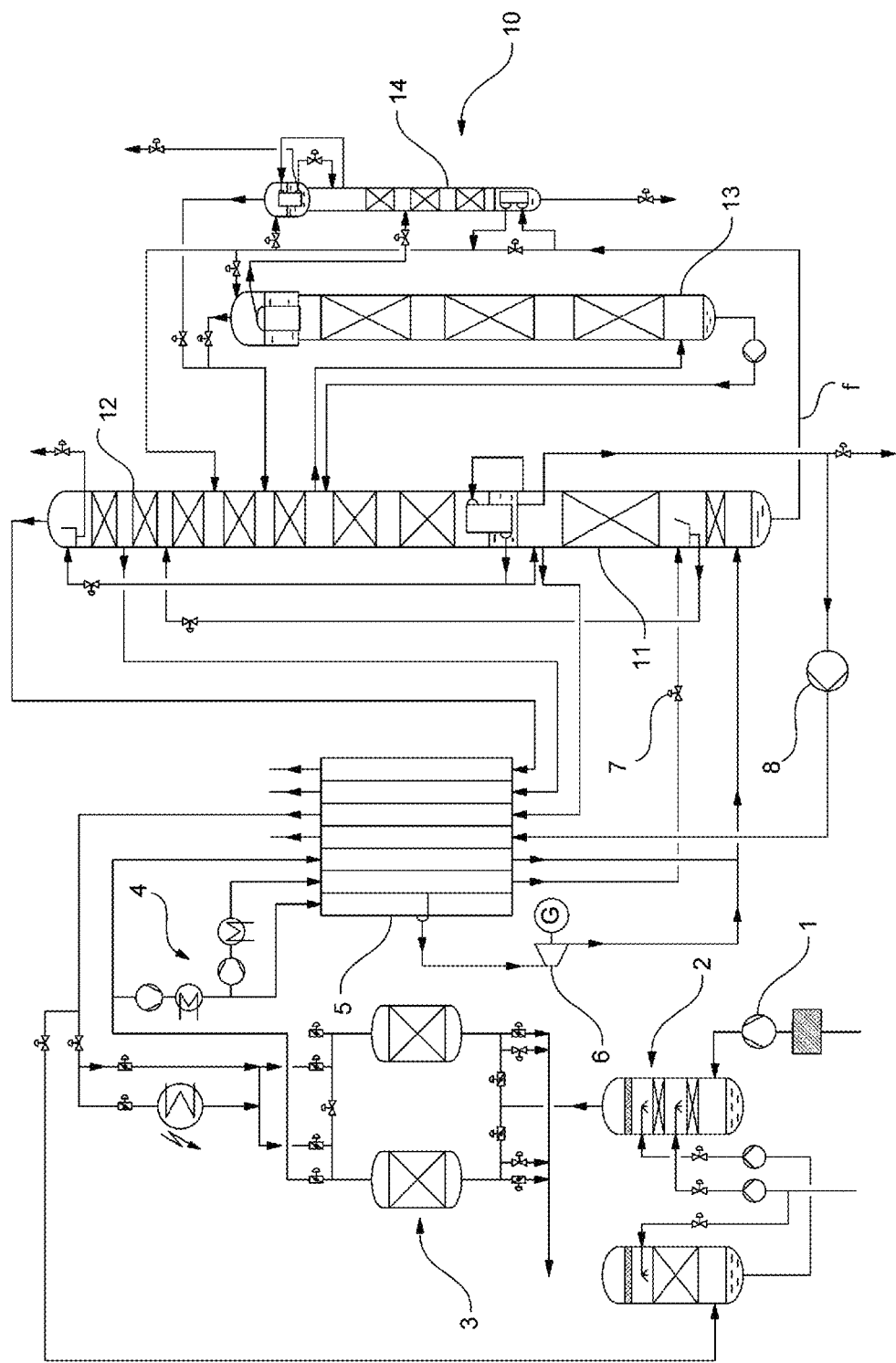

COMPUTER-IMPLEMENTED METHOD FOR SIZING A PROCESS PLANT

The invention relates to a computer-implemented method for sizing a process plant for carrying out a chemical engineering process—in particular, an air separation plant or a natural gas plant.

BACKGROUND OF THE INVENTION

In the course of a planning or design phase, a process plant is first sized, before the process plant, in accordance with the corresponding, selected sizing, is constructed or erected at a corresponding location and ultimately put into operation in order to carry out a chemical engineering process.

In the course of sizing, in particular, variables of the process plant, e.g., the dimensions or capacities of individual elements and components of the process plant or the specific type of different components, can be selected, as can process parameters, in accordance with which the process engineering process is ultimately to be carried out.

In the framework of conventional methods for planning, designing, or sizing process plants, parameters of a process plant to be sized are usually first determined computationally for one design case—usually full load. The calculation or checking of further load cases is then carried out as a function of this design case. If it is not possible to operate all relevant operating cases with the design of the design case, the sizing parameters are usually adapted so that the plant can be operated in all cases that are taken into account. This usually takes place iteratively and manually. Tedious iterations are often necessary here if the selected design cannot be operated for all specified operating cases. An optimal design—in particular, for a multiplicity of operating cases to be taken into account—can often not be found with such an iterative method, since the selected design can deviate from the optimal design for several operating cases.

DISCLOSURE OF THE INVENTION

Based upon this prior art, a computer-implemented method for sizing a process plant for carrying out a chemical engineering process with the features of claim 1 is proposed. Advantageous embodiments are the subject matter of the dependent claims and the following description.

The process plant can, in particular, be an air separation plant or, in general, a fluid separation plant or a natural gas plant. Accordingly, the process engineering process is, in particular, an air separation or a natural gas liquefaction.

In this context, sizing of the process plant should be understood, in particular, to mean that specific values are determined for process plant variables and/or for process parameters, in accordance with which the process plant is to be designed and built and in accordance with which the chemical engineering process is to be carried out in this process plant.

Within the scope of the invention, a multiplicity of process simulations are performed simultaneously (hereinafter also referred to as in parallel or at the same time) for a process plant, in the course of each of which the process in the process plant is in each case simulated in a computation unit or a computer for a particular application case. An application case is characterized by values of process plant variables and/or values of process parameters.

In this context, process plant variables or also design variables should be understood to mean, in particular, variables which describe or characterize the process plant and, more particularly, individual components of the process plant. For example, these process plant variables may be dimensions of various components of the process plant, such as diameter, length, height, width, etc. For example, these process plant variables may also describe the specific type of individual components or units, e.g., which specific pump is used, or what specific power this pump has, or what specific pressure this pump exerts upon a fluid. Changes in the values of these process plant variables have a particularly direct effect on the process engineering process carried out in the process plant. Various values for the process plant variables characterize, in particular, various process topologies or process plant topologies, and characterize, in particular, specific embodiment of the process plant. The term, "process topology," is to be understood in this context not only as the manner in which different process engineering apparatuses are connected, but, in this context, is, expediently, also used for an identical connection in varying embodiments of a process engineering apparatus.

In this context, process parameters are to be understood, in particular, as variables which directly describe the process engineering process. In particular, these process parameters characterize operating cases in accordance with which the process plant can be run or in accordance with which the process is carried out in the process plant. Various values of the process parameters characterize, in particular, various process variants, in accordance with which the process engineering process can be carried out. For example, these process parameters may relate to educt and/or product specifications of the process engineering process.

In a typical representation, a process simulation for an application case comprises a multiplicity of equations which describe the sequences in the process plant. Setting up such an equation system for an application case and a plant is known in the prior art. The innovation now consists in solving such equations for several different operating cases, but for the same plant, at the same time—preferably by modeling them in a common equation system and then solving this. This overcomes the problems in the prior art. In particular, an optimal design for all operating cases that are taken into account can be found. This results from the fact that optimal values for the process plant variables and/or for the process parameters are determined on the basis of the overall equation system in such a way that at least one predefined condition is met—for example, a target function becomes minimal.

In particular, an overall equation system is thus solved in which at least two different process simulations—in particular, for example, different load situations or workloads—are contained.

In addition to free values of process plant variables or process parameters, which can be optimized independently of one another to fulfill the at least one predefined condition, the fact that the overall equation system relates to one process plant also results in dependent values of process plant variables or process parameters, each of which is dependent upon a free value. In particular, a dependent value of a process plant variable or of a process parameter in a process simulation depends upon a free value of a (preferably the same) process plant variable or of a (preferably the same) process parameter in another process simulation.

To optimally select the free values, a gradient-based optimization method is preferably used, which is based upon the evaluation of an analytical or numerically-generated Jakobi matrix. The resulting overall equation system for sizing a process plant in large-scale technical plant construction is here on the scale of hundreds to tens of thousands of equations.

The dependent values result from the free values in accordance with existing relationships. Dependent values relate, in particular, to design parameters—in particular, process plant variables. Although the design parameter is variable per se and is accessible once as a free value to the optimization, it must then be the same in all process simulations because the plant designs does not change for different operating cases. The value for the parameter in the other process simulations is therefore dependent upon—in this case identical to—the first value.

Such parameters are now also optimized overall for all process simulations under consideration. The simultaneous performance of multiple process simulations can, in particular, also directly detect the influence of such parameters upon the result.

Further preferably, a weighting factor which characterizes the weight (e.g., the frequency of occurrence or probability of occurrence) of a specific process simulation or the associated application case in the overall operation is assigned to each of the multiplicity of process simulations. In particular, frequently occurring operating cases can thereby be weighted higher than rarely occurring operating cases.

The weightings of the process parameters or of the values of the process parameters themselves can, in particular, be used to predefine how relevant individual process parameters or individual values of various process parameters are. For example, it can be predefined that a high product quality have a larger weighting than a high product quantity.

In the course of the various simultaneous process simulations, the process plant or the individual components of the process plant and the chemical sub-processes of the process engineering process taking place in these components are, in particular, modeled or theoretically described. In particular, the individual components of the process plant or the physical and chemical sub-processes taking place therein are described by means of chemical, physical, mathematical equations.

For example, balancing equations for mass, species, energy, and impulse; the 2nd law of thermodynamics; transport equations for species, energy, and impulse; material and chemical equilibrium relationships or reaction equations; as well as empirical and semi-empirical correlation relationships between the above-mentioned aspects or logical combinations of different process parameters serve as the basis for describing process engineering apparatuses.

For a detailed description of the modeling of process engineering processes via mathematical equations, reference is made at this point to, for example, "*Kraume, Matthias: Transportvorgänge in der Verfahrenstechnik: Grundlagen and apparative Umsetzungen. Springer Vieweg, Berlin* [etc.], 2*nd, revised edition,* 2012. *ISBN:* 978-3-642-25148-1."

Flowcharts ("flow sheet"), in particular, are used for performing the simultaneous process simulations. By means of such a flowchart, the individual components of the process plant and their—in particular—fluid- and process-related connections can be modeled in relation to one another. Correspondingly, chemical, physical, mathematical equations characterizing the sub-processes or components are, expediently, used as the basis for such flowcharts.

A specific process simulation or a specific flowchart with specific values of the individual process plant variables thus represents a theoretical image or model of a specific process plant. By means of such a specific process simulation or such a specific flowchart, it is thus possible to simulate how the process engineering process theoretically runs in different ways, i.e., at different values of the process parameters in this specific process plant.

In the course of the simultaneous process simulations, it can thus be modeled, in particular, that, in the same process plant, i.e., in a process plant with the same constant values for process plant variables and thus with the same process topology, the process is carried out on different process variants, i.e., with different values of individual process parameters. It can thus be recognized, in particular, how changes in individual process parameters have an effect in the same process plant.

Furthermore, in the course of the simultaneous process simulations, a multiplicity of different process topologies, i.e., a multiplicity of different values for process plant variables, are, expediently, examined in each case for different operating conditions. In particular, it can thus be recognized how changes in individual process parameters affect the overall method in the case of different process topologies.

The weightings of the process parameters or of the values of the process parameters can, in particular, be used to assess how relevant the effects on the process are in the event of a change in the values of the process parameters. Expediently, correlations of the changes in process plant variables and process parameters are implemented in parallel or simultaneously in the individual process simulations. In particular, correlations or dependencies of individual operating cases or of individual process variants with or upon one another are implemented.

In the context of the method, an optimal set of values for the process plant variables and/or the process parameters is determined and selected from this multiplicity of process simulations that depend upon one another or correlate with one another. In particular, the determination of these optimal values is performed in such a way that at least one predefined condition is met. These conditions may depend, in particular, upon various factors, which, in particular, describe an economic viability and effectiveness of the process plant. For example, this condition can be implemented as a target function, wherein all process simulations are optimized in parallel and, in particular, simultaneously using this target function.

In particular, within the scope of the method, an optimal set of values for the process plant variables and an optimal set of values for the process parameters are thus simultaneously determined as a function of one another. Expediently, an optimal topology for the process plant and a process variant which is optimal for this topology are thus determined. In particular, the optimal values for the process plant variable and the process parameters are determined such that an optimized process plant can be designed and that the process can be carried out in this process plant as effectively and economically or as far according to the selected criteria as possible.

The method is executed, in particular, before the process plant is designed or built—for example, in the course of a planning phase of the process plant. In particular, it can be predefined at the beginning of the planning phase only which chemical engineering process is to be carried out by the process plant, e.g., an air separation or production of liquid natural gas, and at which location the process plant is to be built, i.e., under what environmental conditions the process is to be carried out in the process plant. In the course of the planning phase, a basic plant topology based, for example, upon empirical values can first be used, which is then—in particular, in the course of the present method—specified in such a way that it can be operated at its corresponding location as effectively as possible and as economically as possible according to the criteria selected in the specific case.

In contrast to the conventional methods described in the introduction, within the context of the invention, a multiplicity of different process simulations, which, in particular, depend upon one another and correlate with one another, are performed simultaneously. Effects of value changes in a process simulation are, expediently, taken into account in parallel and simultaneously in the remaining process simulations. Thus, no manual, tedious iterations are necessary. The invention permits the determination of variables to be sized and the optimization of a complex process plant, while simultaneously taking into account a multiplicity of operating cases. Such complex process plants have, in particular, high-level thermal and/or material feedback loops and a highly real material behavior with phase transitions, i.e., no ideal gas behavior, and, in particular, deviations in the specifications of educts and/or products and/or environmental conditions for various operating cases.

The determined optimal values for the process plant variables are, expediently, optimally adapted to the selected operating cases and their weighting. Furthermore, the optimal values for the process plant variables and process parameters are, expediently, selected such that the process plant receives a broad efficiency spectrum over multiple operating cases. With an economic plant service life of 20 to 35 years, in practice, a broad spectrum of load cases is likely to be run.

One or more of the following variables are, advantageously, used as process parameters: a product quantity, a product quality, an educt quantity, an educt quality, an environmental condition, an energy price, a remuneration condition—in particular, for providing energy system services—an availability of components of the process plant, structural or transport-related boundary conditions on the process-engineering components. By changing the values of such process parameters—in particular, product quantity and quality and educt quantity and quality—a multiplicity of different product and educt conditions, in particular, can be taken into account.

Preferably, the at least one predefined condition depends upon at least one cost variable. Variables, in particular, for which the operation of the plant is to be optimized—in particular, in order to allow the highest possible effectiveness and economic viability of the process plant—are to be understood as cost variables.

The at least one predefined condition is, advantageously, met if the at least one cost variable does not exceed or fall below a threshold and/or is as large as possible or as small as possible. Thus, an effective and economical operation of the process plant can be achieved. In particular, several such boundary conditions should also be maintained at the same time, so that multi-variable optimization is present.

Preferably, one or more of the following variables are used as the at least one cost variable: a need for resources, a need for energy, a product need, an educt availability, operating costs, investment costs, compliance with design constraints, product yields, input material quantities, a process plant load, a process plant service life. Minimizing or maximizing, or not exceeding or falling below a threshold of such cost variables thus affects, in particular, the economic viability and effectiveness of the process plant.

Advantageously, one or more variables influencing a fluid flow through the process plant are used as process plant variables—in particular, a flow cross-section and/or a diameter of an element of the process plant, e.g., of pipelines and/or apparatuses. Pressure losses in pipelines and apparatuses are, at a first approximation, dependent, in particular, upon the flow velocity. Flow cross-sections are determined—in particular, either freely or from catalogs of defined diameters—as optimal values for such process plant variables.

To clarify the distinction between free and dependent values, the determination of an optimal pipeline diameter is, subsequently, used. In general, a pipeline pressure loss $\Delta p$ follows the physical law:

$$\Delta p = \zeta \cdot 2 \cdot \rho \cdot v^2$$

where the fluid density is $\rho$, the flow velocity is $v$, and the raw frictional resistance is $\zeta$, which, for example, is defined as $$\zeta = 64 \cdot \eta / (\rho \cdot v \cdot D).$$

for the laminar case. $\eta$ is here the dynamic viscosity, and D is the diameter of the pipeline.

In the parallel simulation of n application cases, the following n equations result for determining the respective pipeline pressure loss $\Delta p_n$ $$\Delta p_n = 32 \cdot \eta_n / D_n \cdot v_n$$

In order to simultaneously do the calculations for one and the same plant, all the diameters $D_n$ must have the same value, which is hereinafter referred to as $D_1$ and is a free value for the sizing of the process plant. As a function of the selection of this free value, solid calculation rules for pressure loss of the form $\Delta p_n = f(\eta_n, D_1, v_n)$ in turn result for the other, simultaneously calculated simulations. The values $D_2 \ldots D_n$ correspond to dependent values, according to the terminology introduced.

Alternatively or additionally, one or more variables characterizing a heat exchanger of the process plant are used as process plant variables—in particular, an entire heat exchanger surface and/or a division of heat exchanger surfaces between side offtakes. A heat transfer coefficient is, at a first approximation, dependent, in particular, upon the flow velocity and thus the throughput, as well as the composition of the streams in the heat exchanger. The relative, geometrical position of side offtakes is, in particular, constant. One free and n−1 dependent values can also be defined for these process plant variables.

Alternatively or additionally, one or more dimensions of the process plant—in particular, a column diameter and/or a column height—are preferably used as process plant variables. One free and n−1 dependent values can also be defined for these process plant variables. Efficacies of mass transfers are dependent, in particular, upon the gas and liquid load and composition, and pressure losses—in particular, upon the flow velocity and the theoretical plate number.

Alternatively or additionally, one or more variables influencing an efficiency of the process are used as process plant variables—in particular, a design point of the process plant and its components—preferably a mass flow, a suction pressure, a final pressure, an inlet temperature, etc. The efficiency is missing, in particular, from the mass flow, the suction and final pressure, and from the inlet temperature. In particular, interpolations using dimensionless machine characteristics are carried out for this purpose.

Boundary conditions for components of the process plant are, advantageously, predefined. These boundary conditions are, expediently, taken into account in the course of the simultaneous process simulations and the determination of the optimal values. In particular, these boundary conditions can be used to predefine the operation of various components of the process plant in technically feasible areas. One or more of the following variables are preferably predefined as such boundary conditions: thermal stresses in heat exchangers, hydraulic limitations of different process-engineering apparatuses, e.g., flooding points of tower internals, pump and load limits, and specific rotational speeds of machines.

In a preferred embodiment, the process plant is a fluid separation plant, and, particularly preferably, an air separation plant. The chemical engineering process is thus, advantageously, a fluid separation and, particularly preferably, an air separation. An air separation plant has as components distillation column systems, in particular, which can be designed, for example, as two-column systems—in particular, as classical Linde double-column systems, but also as three- or multi-column systems. In addition to the distillation columns for obtaining nitrogen and/or oxygen in the liquid and/or gaseous state (for example, liquid oxygen, LOX, gaseous oxygen, GOX, liquid nitrogen, LIN, and/or gaseous nitrogen, GAN), i.e., the distillation columns for separating nitrogen and oxygen, distillation columns for obtaining further air components—in particular, the noble gases krypton, xenon, and/or argon—can be provided. Distillation columns are also referred to as distillation towers. In the context of the method, individual or, in particular, all such components of the air separation plant and the sub-processes taking place therein can, expediently, be sized. For example, within the scope of the invention, a distillation tower of a fluid separation plant can be sized. For example, an input fluid flow rate, which can be changed, in particular, by means of activating a compressor unit, can, among other things, be taken into account as a process plant variable. A distillation tower can be modeled, in particular, in accordance with the method described in application EP17020477.0 or DE102017010787.4.

In a particularly preferred embodiment, the process plant is a natural gas plant, and the chemical engineering process is a natural gas liquefaction or natural gas separation.

Particularly varying specifications of products—in particular, quantities and compositions—and educts—in particular, quantities, compositions, and entry conditions—for example, can, in the context of the method, be taken into account.

In particular, within the scope of the method, a design and/or an optimization of combined natural gas plants can be carried out. At least two process steps are coupled in such combined natural gas plants. Such a process step can, for example, be the separation of high boilers—in particular, of $C_2+$ or $C_3+$—to produce LPG (liquefied petroleum gas).

Another such process step can be the separation of nitrogen and/or helium, e.g., by means of what is known as a nitrogen rejection unit (NRU), which can reduce the nitrogen content in the natural gas to below one percent. Another process step may be the liquefaction of a natural gas stream to produce liquefied natural gas (LNG).

A computation unit according to the invention is designed—in particular, programmed—to carry out a method according to the invention.

The implementation of the method in the form of a computer program is also advantageous, since this yields particularly low costs—particularly if an executing control unit is still used for further tasks and is therefore present anyway. Suitable data carriers for providing the computer program are, in particular, magnetic, optical, and electrical memories such as hard disks, flash memories, EEPROM's, DVD's, and the like. A download of a program via computer networks (Internet, Intranet, etc.) is also possible.

Further advantages and embodiments of the invention arise from the description and the accompanying drawing.

The invention is schematically represented in the drawing using exemplary embodiments and will be described below with reference to the drawing.

BRIEF DESCRIPTION OF THE DRAWINGS

FIG. 1 schematically shows a process simulation of a process plant such as can be created in the course of a preferred embodiment of a method according to the invention.

DETAILED DESCRIPTION OF THE DRAWINGS

In a preferred embodiment of a method according to the invention, a process plant, e.g., an air separation plant, is to be sized.

In this case, a multiplicity of process simulations are simultaneously performed in a computation unit or a computer, in the course of each of which the process of the air separation in the air separation plant is simulated in each case for an application case which is characterized by values of process plant variables and values of process parameters.

In the course of each of these process simulations, a process flowchart ("flow sheet") which models the air separation plant is in each case used. The air separation plant or its individual components and the sub-processes of the air separation taking place in the individual components are theoretically described here by chemical, physical, mathematical relationships in the form of equations. The fundamental topology to be used as the basis can be obtained, for example, from empirical values.

An example of such a process simulation, as can be created in the course of a preferred embodiment of the method according to the invention, is shown schematically in FIG. 1.

The air separation plant simulated in the flowchart has, inter alia, a main air compressor 1, a pre-cooling device 2, a cleaning system 3, a secondary compressor arrangement 4, a main heat exchanger 5, an expansion turbine 6, a throttle device 7, a pump 8, and a distillation column system 10. In the example shown, the distillation column system 10 comprises a classical double-column arrangement consisting of a high-pressure column 11 and a low-pressure column 12 as well as a crude argon column 13 and a pure argon column 14.

In the simulated air separation plant, in the course of a simulated air separation, an input air stream is sucked in and compressed by means of the main air compressor 1 via a filter (not labeled). The compressed input air stream is supplied to the cooling water-operated, pre-cooling device 2. The pre-cooled input air stream is purified in the cleaning system 3. In the cleaning system 3, which typically comprises a pair of adsorber containers used in alternating operation, the pre-cooled input air stream is largely freed of water and carbon dioxide.

Downstream of the cleaning system 3, the input air stream is divided into two substreams. One of the substreams is completely cooled in the main heat exchanger 5 at the pressure level of the input air stream. The other substream is recompressed in the secondary compressor arrangement 4 and likewise cooled in the main heat exchanger 5, but only to an intermediate temperature level. After cooling to the intermediate temperature level, this so-called turbine stream is expanded by means of the expansion turbine 6 at the pressure level of the completely cooled substream, combined with it, and fed into the high-pressure column 11.

In the high-pressure column 11, an oxygen-enriched, liquid bottom fraction and a nitrogen-enriched, gaseous top fraction are formed. The oxygen-enriched, liquid bottom fraction is drawn off from the high-pressure column 11, partially used as a heating medium in a bottom evaporator of the pure argon column 14, and fed in defined proportions into a top condenser of the pure argon column 14, a top condenser of the crude argon column 13, and the low-pressure column 12 respectively. Fluid evaporating in the evaporation spaces of the top condensers of the crude argon column 13 and the pure argon column 14 is also transferred into the low-pressure column 12.

From the top of the high-pressure column 11, the gaseous, nitrogen-rich top product is drawn off, liquefied in a main condenser which establishes a heat-exchanging connection between the high-pressure column 11 and the low-pressure column 12, and fed in proportions as reflux to the high-pressure column 11 and expanded into the low-pressure column 12.

In the low-pressure column 12, an oxygen-rich, liquid bottom fraction and a nitrogen-rich, gaseous top fraction are formed. The former is partially pressurized in liquid form in the pump 8, heated in the main heat exchanger 5, and provided as product. A liquid, nitrogen-rich stream is drawn off from a liquid-retaining device at the top of the low-pressure column 12 and is discharged from the air separation plant as liquid nitrogen product. A gaseous, nitrogen-rich stream drawn off from the top of the low-pressure column 12 is passed through the main heat exchanger 5 and is provided as nitrogen product at the pressure of the low-pressure column 12. Furthermore, a stream is drawn off from the low-pressure column 12 from an upper region and, after heating in the main heat exchanger 5, is used as so-called impure nitrogen in the pre-cooling device 2 or, after heating by means of an electric heater, in the cleaning system 3.

In total, in the course of the simulated air separation, air (AIR) is supplied to the tower or to the low-pressure column 12, and at least oxygen and nitrogen are withdrawn, each in gaseous (GOX, GAN) and/or liquid (LOX, LIN) form. Furthermore, impure nitrogen (UN2) is usually drawn off, and, if desired, noble gases such as argon, etc.

As explained above, within the context of the method, a multiplicity of such process simulations are performed simultaneously, each for different application cases.

In particular, the values of different process parameters are changed in order to provide the multiplicity of process simulations, so that different process variants are simulated. For example, as such process parameters, an educt quantity and educt quality are changed. For a change in the educt quantity, a volume or mass flow or a flow rate of the input air sucked in by means of the main air compressor 1 can, for example, be changed. As an educt quality, the temperature of the air can, for example, be changed, or impurities in the air can be changed.

Furthermore, product quantities and product qualities, for example, are changed as process parameters, e.g., quantities and compositions of the liquid nitrogen drawn off from the low-pressure column 12 and of the liquid oxygen.

The product quantities and product qualities are provided, in particular, with a specific weighting for the individual simulations. The higher the proportional values for this weighting, the more important the specification of this process parameter.

Furthermore, for the multiplicity of simulations, as the value for the process plant variable, the entire heat exchanger surface and its division between side offtakes of the main heat exchanger 5 are, for example, changed. At a first approximation, the heat transfer coefficient of the main heat exchanger 5 depends, for example, upon the flow velocity and the composition of the streams. The relative, geometrical position of side offtakes and the size of heat transfer used are the same in all simulations (dependent values).

As further process plant variable, flow cross-sections, e.g., flow cross-sections of the substreams downstream of the cleaning system 3, are changed. Pressure losses in pipelines and apparatuses are, at a first approximation, dependent upon the flow velocity.

Furthermore, as process plant variable, the height and diameter of the tower or of the low-pressure column 12 are changed. The efficacy of the mass transfer depends here upon the gas and liquid load, and the pressure loss upon the flow velocity, the type of plate, and the theoretical plate number.

The efficiency of the air separation plant is missing, in particular, from the optimal operating points, the mass flows, the suction and end pressures, and from the entry or intermediate cooling temperatures in the compressors used. These process plant variables or the design point of the compressors—generally, the optimal operating point—are likewise changed in the course of the simulations.

Furthermore, boundary conditions can be predefined for the simulations, e.g., thermal stresses in the main heat exchanger 5, hydraulic limits, e.g., the flooding points of tower internals, as well as pump and load limits of the main air compressors 1, the secondary compressors 4, the throttle device 7, and the pump 8.

Various embodiments or process topologies of the air separation plant are thus simulated in each case by changing the corresponding process plant variables. Different process variants or operating cases are simulated in each case by changing the corresponding process parameters. In particular, each process variant is simulated in the course of the multiplicity of simulations for each of the different process topologies of the air separation plant.

In particular, the dependencies of the various operating cases upon one another are simultaneously implemented in the simulations. Thus, for example, correlations of the changes in the values of the process plant variables and the process parameters are implemented in parallel or simultaneously in the individual process simulations. In particular, correlations or dependencies of individual operating cases or individual process variants with or upon one another are thus implemented.

In particular, the multiplicity of process simulations can be performed simultaneously by solving equations underlying the multiplicity of process simulations as a common equation system. In this case, optimal values for the process plant variables and for the process parameters are determined in such a way that predefined conditions are met. For this purpose, the individual process simulations performed are simultaneously optimized via a common target function. This target function is composed, for example, of the criteria of resource need, operating costs, and investment costs.

By simultaneously optimizing the individual process simulations performed via this common target function, optimal values for the process plant variables and the process parameters are determined, so that, as predefined, conditions are met that the resource need, the operating costs, and the investment costs each be as small as possible.

Based upon the optimal values determined in this way for the corresponding process plant variables and the corresponding process parameters, a sizing is found according to which the air separation plant can be built and operated.

A selection of a suitable topology is thus carried out by simultaneously optimizing a multiplicity of possible process variants under exactly the same boundary conditions. Furthermore, a minimization of the need for resources, operating costs, or investment costs is carried out, taking into account a multiplicity of possible operating cases of one and the same process topology.

The invention claimed is:

1. A computer-implemented method for sizing a process plant for carrying out a chemical engineering process, comprising:
    simultaneously performing a multiplicity of process simulations, in the course of each of which a process in the process plant is in each case simulated for a particular application case, wherein each process simulation for the particular application case comprises a multiplicity of equations which describe the sequences in the process plant; the multiplicity of equations includes chemical, physical and mathematical relationships;
    wherein each application case includes values of process plant variables which correspond to dimensions or capacities of components of the process plant and and/or values of process parameters for which operating cases in accordance with which the process plant can be run or in accordance with which the process is carried out in the process plant;
    wherein, in the multiplicity of process simulations, values for the process plant variables and for the process parameters are determined such that at least one predefined condition is met,
    wherein free values for process plant variables and/or process parameters are determined, and wherein dependent values for process plant variables and/or process parameters are determined from the free values for process plant variables and/or process parameters,
    wherein at least one of the dependent values of the process plant variable or of the process parameter in one of the multiplicity of process simulations depends upon one of the free value of the process plant variable or of the process parameter in another of the multiplicity of process simulations, and
    wherein the multiplicity of process simulations is performed simultaneously by solving the multiplicity of equations underlying the multiplicity of process simulations as a common equation system, and
    implementing the determined process plant variables and process parameters from the common equation system in operating of the process plant for the chemical engineering process.

2. The computer-implemented method according to claim 1, wherein the free values for process plant variables and/or process parameters are determined by a gradient-based optimization method which is based upon the evaluation of an analytical or numerically-generated Jakobi matrix.

3. The computer-implemented method according to claim 1, wherein the multiplicity of process simulations is each assigned a weighting factor.

4. The computer-implemented method according to claim 1, wherein weightings for different values of process parameters are taken into account for each of the multiplicity of simulations.

5. The computer-implemented method according to claim 1, wherein one or more of the following variables are used as process parameters for the simulations:
    a product quantity,
    a product quality,
    an educt quantity,
    an educt quality,
    an environmental condition,
    an energy price,
    a remuneration condition,
    an availability of components of the process plant,
    structural or transport-related boundary conditions on process-engineering components of the process plant.

6. The computer-implemented method according to claim 1, wherein the at least one predefined condition depends upon at least one cost variable.

7. The computer-implemented method according to claim 6, wherein the at least one predefined condition is met when the at least one cost variable does not exceed or fall below a threshold and/or is as large as possible or as small as possible.

8. The computer-implemented method according to claim 6, wherein one or more of the following variables are used as the at least one cost variable:
    a need for resources,
    a need for energy,
    a product need,
    an educt availability,
    operating costs,
    investment costs,
    compliance with design constraints,
    product yields,
    input material quantities,
    a process plant load,
    a process plant service life.

9. The computer-implemented method according to claim 1, wherein one or more variables characterizing a heat exchanger of the process plant are used as process plant variables—in particular, an entire heat exchanger surface and/or a division of heat exchanger surfaces between side offtakes.

10. The computer-implemented method according to claim 1, wherein one or more variable influencing a fluid flow through the process plant is used as the process plant variables—in particular, a flow cross-section and/or a diameter of an element of the process plant.

11. The computer-implemented method according to claim 1, wherein one or more dimensions of the process plant are used as process plant variables.

12. The computer-implemented method according to claim 1, wherein one or more variable influencing an efficiency of the process is used as process plant variables.

13. The computer-implemented method according to claim 1, wherein boundary conditions for components of the process plant are predefined.

14. A computer designed to execute a method according to claim 1.

15. A non-transitory machine-readable storage medium having a computer program that cause a computer to carry out a method according to claim 1 stored thereon.

16. The computer-implemented method according to claim 11, wherein the one or more dimensions of the process plant include a tower diameter or a tower height.

17. The computer-implemented method according to claim 12, wherein the one or more variable includes a design point of the process plant and its components.

* * * * *